(12) United States Patent
Butterfield, IV et al.

(10) Patent No.: US 11,415,593 B1
(45) Date of Patent: Aug. 16, 2022

(54) MULTIPLEXING APPARATUS FOR MEASURING AIR FLOW AND AIR TEMPERATURE

(71) Applicant: Chevron U.S.A. Inc., San Ramon, CA (US)

(72) Inventors: Albert E. Butterfield, IV, Novato, CA (US); Jeffrey Brandon Dooley, Katy, TX (US); Ronald W. Hill, The Woodlands, TX (US); Ian Addington Luna, Martinez, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/331,034

(22) Filed: May 26, 2021

(51) Int. Cl.
*G01P 5/07* (2006.01)
*G01P 1/02* (2006.01)

(52) U.S. Cl.
CPC .............. *G01P 5/07* (2013.01); *G01P 1/026* (2013.01)

(58) Field of Classification Search
CPC .................................. G01P 5/07; G01P 1/026
USPC ........................................................ 73/861.94
See application file for complete search history.

(56) References Cited

U.S. PATENT DOCUMENTS

| | | | | |
|---|---|---|---|---|
| 2,981,104 A * | 4/1961 | Anger | ................ | G01P 5/12 73/170.12 |
| 3,685,355 A * | 8/1972 | DeBaun | ................ | G01F 1/40 73/861.66 |
| 3,748,901 A * | 7/1973 | DeBaun | ................ | G01P 5/16 73/861.66 |
| 4,030,358 A * | 6/1977 | Noll | ................ | G01P 5/14 73/861.66 |
| 4,481,829 A * | 11/1984 | Shortridge | ................ | G01F 1/46 73/861.66 |
| 5,667,189 A * | 9/1997 | Kester | ................ | F24F 11/74 248/200.1 |
| 5,786,525 A * | 7/1998 | Freund | ................ | F24F 11/30 73/1.34 |
| 5,852,240 A * | 12/1998 | LeBlanc | ................ | G01F 23/162 73/216 |
| 6,705,158 B1 * | 3/2004 | Louden | ................ | G01F 1/68 73/861.85 |
| 10,001,151 B2 * | 6/2018 | Moss | ................ | F15D 1/02 |
| 2009/0241688 A1 * | 10/2009 | Reichel | ................ | G01F 15/063 248/688 |
| 2018/0238746 A1 * | 8/2018 | Quant | ................ | F01D 17/085 |

\* cited by examiner

*Primary Examiner* — Nathaniel T Woodward
(74) *Attorney, Agent, or Firm* — King & Spalding LLP

(57) ABSTRACT

A portable air fan measurement tool that is configured to measure air flow and air temperature. The air fan measurement tool includes a base comprising a magnet, the magnet being configured to attach the base to an air fan ring of an air fan. The portable air fan measurement tool also includes a vertical support having a first end configured to engage the base. The portable air fan measurement tool further includes an angular support having a first end configured to engage the vertical support and a horizontal support having a first end configured to engage a second end of the angular support. Moreover, the portable air fan measurement tool includes a boom having a first end configured to engage a second end of the vertical support and a second end of the horizontal support, and a plurality of air fan measurement devices that are disposed on the boom.

20 Claims, 7 Drawing Sheets

700

Assemble a boom by connecting a plurality of segments 702

Attach a plurality of air fan measurement devices to the boom 704

Attach a base to an air fan guard of an air fan, wherein blades of the air fan rotate in an air fan plane 706

Attach a vertical support to the base, attaching an angular support and a horizontal support to the vertical support, and connecting the angular support and the horizontal support, respectively 708

Install the boom by attaching the boom to the vertical support and the horizontal support, the boom having a major length with a longitudinal axis passing along the major length, wherein the longitudinal axis is parallel to the air fan plane 710

Adjust the horizontal support and the angular support to orient the boom such that the longitudinal axis is parallel to the air fan plane 712

Adjust the plurality of air fan measurement devices to be parallel to the air fan plane 714

Power on the plurality of air fan measurement devices to measure air flows generated by the air fan and temperatures of the air flows 716

FIG. 7

MULTIPLEXING APPARATUS FOR MEASURING AIR FLOW AND AIR TEMPERATURE

TECHNICAL FIELD

The present disclosure relates generally to a portable air fan, or air cooler, measurement tool that measures air flow and air temperature.

BACKGROUND

Air fans, or air coolers, are generally utilized in production facilities to keep air moving, remove hot air, and reduce perceived temperature therein. There are usually a large number of air fans installed in large production facilities, and each air fan is larger than standard fans and designed for moving high volumes of hot air more effectively. These air fans may be installed at various locations, e.g., on the ceiling above the production facility, or under a factory floor below the production facility, to remove heat.

According to industry standards, it is required to routinely measure the air fans' performance by reading the air flow and air temperature close to the air fan. The current approach of the air fan measurement is to manually extend a thermo-anemometer to a location that is above or below the air fan. The measurement on each location may take up to 30 seconds and needs to be repeated for 2-3 times for an averaged reading. In addition, an operator needs to move the thermo-anemometer to various measurement locations per fan quadrant to repeat the measurement as required. This measurement is also requested to be taken at specific locations that are within concentric circles about a center of the air fan, therefore the accuracy of the measurement results is dependent on the skill and endurance of the operator. Further, considering the periods of time needed for each measurement, the repetition of measurements at each location, the various measurement locations on each air fan, and the number of air fans in each production facility, holding the measurement instrument stationary may be challenging for the operator and lead to risk of Repetitive Strain Injury (RSI). Moreover, the operator may need to stand on uneven surfaces to approach the air fans that are hard to reach, leading to the operator being directly exposed to hot air streams in some cases. Thus, expediting the measurement process can be beneficial to the operator and data integrity in multiple ways.

Therefore, a portable air fan measurement tool that helps measure air flow and air temperature at various locations close to the air fan and that is configured to deliver repeatable and accurate measurement results is desirable.

SUMMARY

The present disclosure relates generally to measuring air flow and air temperature using a portable air fan measurement tool. In an example embodiment, a portable air fan measurement tool includes a base comprising a magnet, the magnet being configured to attach the base to an air fan ring of an air fan, wherein blades of the air fan rotate in an air fan plane. Further, the portable air fan measurement tool includes a vertical support having a first end configured to engage the base, wherein the vertical support is disposed adjacent to the air fan ring when the base is attached to the air fan ring. The portable air fan measurement tool also includes an angular support having a first end configured to engage the vertical support and a horizontal support having a first end configured to engage a second end of the angular support. Moreover, the portable air fan measurement tool includes a boom having a first end that is configured to engage a second end of the vertical support and a second end of the horizontal support, the boom having a major length with a longitudinal axis passing along the major length, wherein the longitudinal axis extends across the air fan plane when the base is attached to the air fan ring. Lastly, the portable air fan measurement tool includes a plurality of air fan measurement devices that are disposed on the boom, each of the plurality of air fan measurement devices including an anemometer configured to measure an air flow generated by the air fan and a thermometer configured to measure a temperature of the air flow, wherein the plurality of air fan measurement devices are adjusted to be parallel to the air fan plane.

In another example embodiment, a method of operating an air fan measurement tool includes assembling a boom by connecting a plurality of segments and attaching a plurality of air fan measurement devices to the boom. The method also includes attaching a base to an air fan ring of an air fan, wherein blades of the air fan rotate in an air fan plane, and attaching a vertical support to the base, attaching an angular support and a horizontal support to the vertical support, and connecting the angular support and the horizontal support, respectively. Further, the method includes installing the boom by attaching the boom to the vertical support and the horizontal support, the boom having a major length with a longitudinal axis passing along the major length. Moreover, the method includes adjusting the horizontal support and the angular support to orient the boom such that the longitudinal axis extends across the air fan plane and adjusting the plurality of the air fan measurement devices to be parallel to the air fan plane. Lastly, the method includes powering on the plurality of air fan measurement devices to measure air flows generated by the air fan and temperatures of the air flows.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein:

FIG. 7 illustrates a method for measuring air flow and air temperature by the air fan measurement tool according to an example embodiment.

Figure 1:
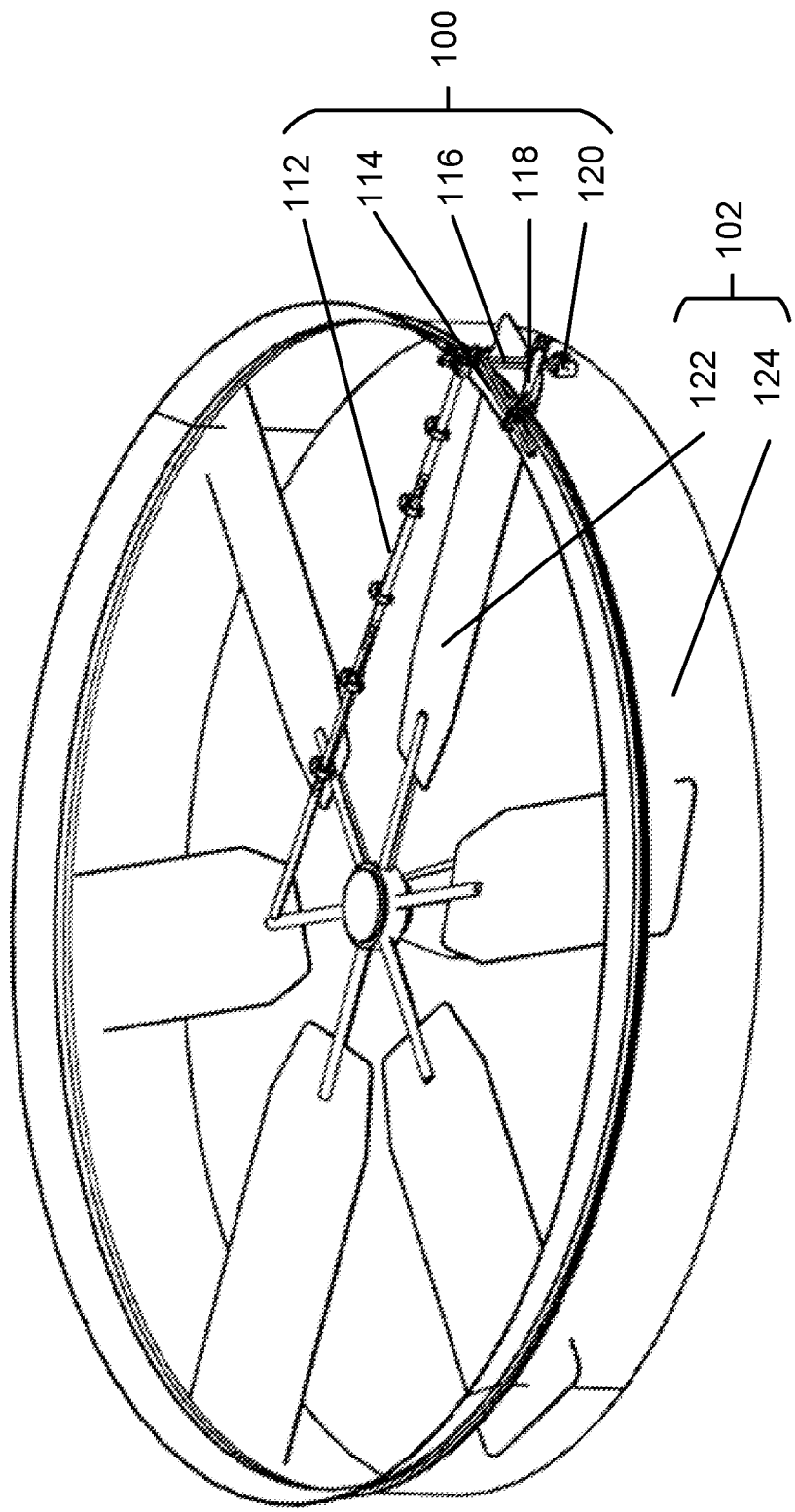
FIG. 1 illustrates an exemplary air fan measurement tool installed on an air fan according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Turning now to the drawings, FIG. 1 illustrates an exemplary air fan measurement tool 100 installed on an air fan 102 according to an example embodiment. The air fan measurement tool 100 is attached on an air fan ring 124 to measure air flow that is generated by the air fan 102 and temperature of the generated air flow.

In an example embodiment, the air fan 102 is an axial fan consists of a rotating arrangement of a plurality of blades 122. The plurality of blades 122 are disposed within the air fan ring 124 and rotated in an air fan plane. In this example, the plurality of blades 122 are configured to rotate to act on the air, and then create a flow of air. In general, each of the air fan blades 122 includes a leading edge and a trailing edge, and is pitched at an angle to a horizontal plane in order to vary the amount of air flow therethrough. Further, the air fan ring 124 is configured to increase safety of operating the air fan 102 by preventing objects from contacting the air fan blades 122. The air fan 102 may be powered by electric motors, hydraulic motors, or internal combustion engines. In addition, the air fan blades 122 can be designed in various shapes to produce air flows with high volume and low pressure. In this example, the air fan 102 can be used for climate control, dust removing, and ventilation. Specifically, the air fan 102 can be configured to generate air flow parallel to the axis of rotation of the air fan blades 122 to move hot air or increase heat convection into a surrounding environment. The air fan 102 may be located on top of a machine and process for cooling. In another example embodiment, the air fan 102 may be installed below a machine or process for heat exchanging with surrounding air. The air blades 122 may be made of wood, plastic, composite materials, or metal materials. In this example, the air fan ring 124 may be made by metal materials including aluminum, iron, copper, or their alloys.

In an example embodiment, the portable air fan measurement tool 100 is configured to measure air velocity and air flow temperature above or below the air fan 102. Specifically, air fan measurement tool 100 contains a plurality of air fan measurement devices for the air flow and air temperature measurement. As shown in FIG. 1, the air fan measurement tool 100 comprises a boom 112 that hangs horizontally above the air fan 102 and the plurality of air fan measurement devices attached there on. The boom 112 may have a length similar to a radius of the air fan 102 and may extend from the air fan ring 124 to a center of the air fan 102. The plurality of air fan measurement devices are spaced from each other on the boom 112 and measure the air flow and air temperature at various radial distances from the air fan 102 center to the edge. Specifically, the distances between the plurality of air fan measurement devices on the boom will vary. Described another way, the air fan measure devices are positioned on concentric circles about the axis of rotation of the air fan 102.

In an example embodiment, the air fan measurement tool 100 also includes a vertical support 116, an angular support 118, and a horizontal support 114 that are interconnected to provide mechanical support to the boom 112. In particular, the boom 112 engages the vertical support 116 and horizontal support 114 to be stabilized at a position above the air fan 102. More specifically, a relative position of the boom 112 to the air fan 102, e.g., a vertical tilting angle of the boom 112, can be adjusted by securing the vertical support 116, the angular support 118, and the horizontal support 114 through their interconnections, accordingly. In this example, the vertical support 116 is disposed adjacent to the air fan ring 124 when the base 120 is attached to the air fan ring 124.

In an example embodiment, the air fan measurement tool 100 includes a base 120 that attaches the air fan measurement tool 100 to the air fan. As shown in FIG. 1, the base 120 is attached to the air fan ring 124 and provides mechanical support to the vertical support 118 through an engagement therebetween. In this example, the base 120 contains a magnet that attaches the base 120 to the air fan ring 124 through a magnetic force generated by the magnet. In this example, the magnet of the base 120 can be manually switched on or off. An operator can manually switch the magnet of the base 120 to adjust the location of the air fan measurement tool 100 relative to the air fan 102.

In another example embodiment, the air fan 102 includes an air fan guard (not shown) that is tilted from the air fan plane for specific designs and applications. For example, a sloped air fan guard is installed on the air fan 102 with a center high and edge low profile. In this example, the air fan measurement tool 100 is adjusted to have the boom 112 extend from the sloped air fan guard towards the center of the air fan 102, but the longitudinal axis of the boom 112 is not necessarily parallel to the air fan plane. Specifically, a second end of the boom 112 that is close to the center of the air fan 102 is tilted up, while a first end of the boom 112 toward the air fan ring 124 is tilted downward. As discussed above, the boom 112 engages the vertical support 116 and the horizontal support 114. The tilting of the boom 112 is conducted by adjusting the interconnections between the vertical support 116, the horizontal support 114, and the boom 112. Here, the boom 112 of the air fan measurement tool 100 is adjusted according to the profiles of the air fan guard. In alternate embodiments, the longitudinal axis of the boom 112 may be parallel to the air fan plane. Irrespective of whether the longitudinal axis of the boom 112 is parallel to the air fan plane, the air fan measurement devices that are attached on the boom 112 are adjusted to be in parallel to the air fan plane for the air flow measurement and air temperature measurement. In other words, the anemometers of the air fan measurement devices spin about an anemometer axis that is parallel to the axis of rotation of the about which the blades of the air fan 102 rotate.

In an example embodiment, the air fan measurement tool 100 consists a plurality of air fan measurement devices, each of the air fan measurement devices embedding an anemometer and a thermometer for the air flow measurement and air temperature measurement, respectively. In this example and as shown in FIG. 1, the air fan measurement tool 100 includes 5 air fan measurement devices that are located on the boom 112. These air fan measurement devices are spread along the air fan radius from the center to the edge, measuring air flow and air temperature at various air fan radial locations. Each of the air fan measurement devices may be connected to an air fan measurement interface device through an electrical cable to transfer and store measurement data with the air fan measurement interface device. The electrical cables may be grouped and aligned along the major length of the boom 112 by passing through a plurality of wire management rings that are disposed on the boom 112. In an example embodiment, the plurality of air fan measurement devices may be configured to take the air flow measurement for up to 30 seconds at each measurement location. In addition, repeated measurements, e.g., 2 or 3 times, at each measurement location close to the air fan 102 may be required to collect more data. In an example embodiment, the air fan measurement tool 100 is configured to measure at multiple, e.g., 5 or more, locations per air fan quadrant, according to industry standards.

In an example embodiment, the air fan 102 is located above a facility and configured to generate air flows from bottom to up. In this example, the air fan 102 removes heat generated by the facility located underneath by providing cool air. Here, the air fan measurement tool 100, as shown in FIG. 1, is attached on the air fan ring 124 and has the boom 112 hanging above the air fan 102. Hot air generated by the facility passes through the air fan by rotating the air fan blades 114 and is measured by the air fan measurement devices attached on the boom 112. Specifically, the embedded anemometer in each of the air fan measurement devices is configured to measure air velocity and determines an average air speed through the air fan 102. Then the averaged air speed in feet per minute is multiplied by an area of the air fan in square feet to determine the air flow through the air fan 102. The temperatures of the air flow at various measurement locations can be measured and averaged by the thermometers embedded in each of the air fan measurement devices, respectively.

In another example embodiment, the air fan 102 is located below a facility and configured to generate air flows from bottom to up to remove heat from the facility and exchange it with cool air from the surrounding environment. In this example, the air fan measurement tool 100 is attached on the air fan ring 124 but has its boom 112 hanging below the air fan 102. With this configuration, the air fan measurement devices are disposed below and orientated parallel to the axis of rotation of the air fan blades 122 so as to measure the air flow and air temperature. In other words, the axis of rotation of the air fan measurement devices is oriented in parallel with the axis of rotation about which the blades of air fan 102 rotate. Similarly, the boom 112 of the air fan measurement tool 100 extends across the air fan 102 and can be either parallel with the air fan plane or tilted to address obstructions, space limitations etc.

Figure 2:
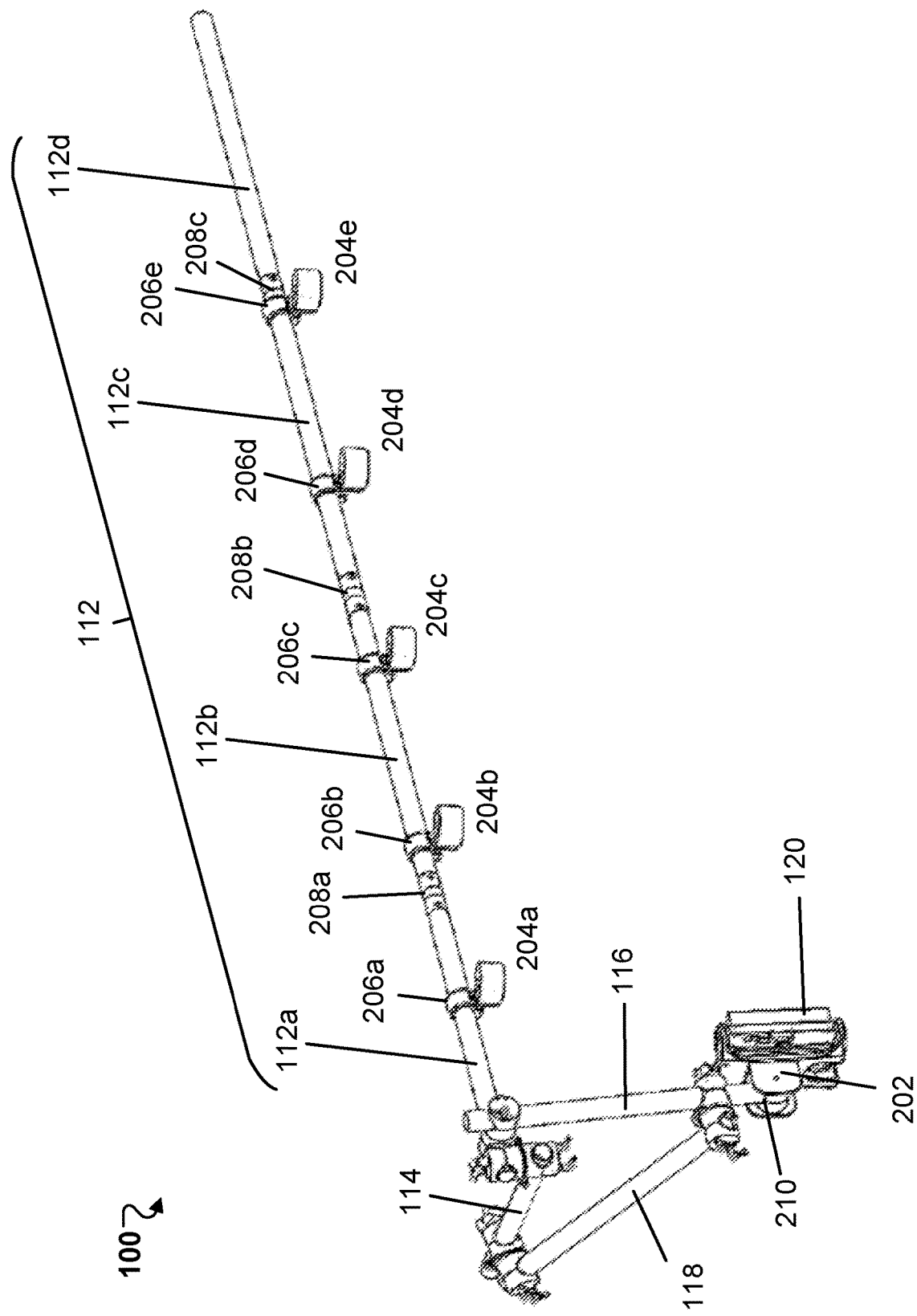
FIG. 2 is a perspective view of the air fan measurement tool according to the example embodiment.

FIG. 2 is a perspective view of the air fan measurement tool 100 according to the example embodiment. To minimize redundancy, not all features of the air fan measurement tool 100 discussed with respect to FIG. 1 are repeated below. As described earlier, the air fan measurement tool 100 includes the base 120, the vertical support 116, the angular support 118, the horizontal support 114, and the boom 112. FIG. 2 illustrates detailed configurations and components included in the base 120 and the boom 112.

In an example embodiment, the base 120 has a base holder 202 that is located on one side of the base 120 that is opposite to the air fan ring 124. The base holder 202 may be firmly mounted on the base 120 by screws. In addition, the base holder 202 has a through hole 210 that is formed vertically through a clamp of the base holder 202. As shown in FIG. 2, a first end of the vertical support 116 is configured to pass through the through hole 210 of the base holder 202. Moreover, the base holder 202 may include a securing pin that passes through the first end of the vertical support 116 and the through hole 210 of the base holder 202, to secure the vertical support 116 on the base holder 202. Alternatively, the vertical support 116 may be secured on the base holder 202 by tightening the base holder clamp using a slide lock engaged to the base holder clamp. The slide lock may be tightened so that the vertical support 116 is secured firmly to the base 120.

In an example embodiment, the base 120 may include a mechanical button that is configured to move the magnet embedded in the base 120 close to or away from a contact interface when the base 120 is being attached to the air fan ring 124. The location of the magnet relative to the air fan ring 124 will change the effective magnetic force applied therebetween. The operator can manually switch off the magnet by moving the magnet away from the air fan ring 124 when needed to adjust the location of the base 120 on the air fan 102 or remove the air fan measurement tool 100. Once the base 120 is disposed on a desired location on the air fan ring 124, the operator can switch on the magnet by moving the magnet closer to the air fan ring 124 to attach the base 120 thereon.

In an example embodiment, the base 112 includes a plurality of segments 112a, 112b, 112c, and 112d. As shown in FIG. 2, the segments are connected by segment connectors 208a, 208b, and 208c. Each of the segments 112a, 112b, 112c, and 112d may be fabricated to have a same length equal to or shorter than 2 feet. According to a size of the air fan, the number of segments used for assembling the boom 112 may be adjusted. For example, for an air fan ranging anywhere from 12 feet to 14 feet in diameter, the air fan measurement tool 100 may utilize 3 or 4 segments to form the boom 112 that has a major length of 6 feet to 8 feet along its longitudinal axis. With this configuration, air fan measurement devices attached on the boom 112 can be adjusted at various air fan radius distances to measure the air flow and air temperature at different locations of the air fan quadrant.

In an example embodiment, the air fan measurement tool 100 includes the plurality of air fan measurement devices 204a, 204b, 204c, 204d, and 204e. These air fan measurement devices are each attached on the boom 112 by mounting clamps 206a, 206b, 206c, 206d, and 206e, respectively. In this example, the air fan measurement devices 204a, 204b, 204c, 204d, and 204e are located at various positions on the boom 112 by adjusting locations of the mounting clamps 206a, 206b, 206c, 206d, and 206e, accordingly. Specifically, the locations of the mounting clamps are adjusted to locate the plurality of air fan measurement devices 204 on concentric circles about a center of the air fan 102 for the air flow and air temperature measurements. Further, each of the air fan measurement devices 204 can be tilted independently to align with the air flow and the air fan plane. In an example embodiment, the boom 112 including the plurality of segments 112 and the segment connectors 208 are made of titanium or titanium alloys that are superior to other materials in providing mechanical stability of the air fan measurement tool 100.

Figure 3A:
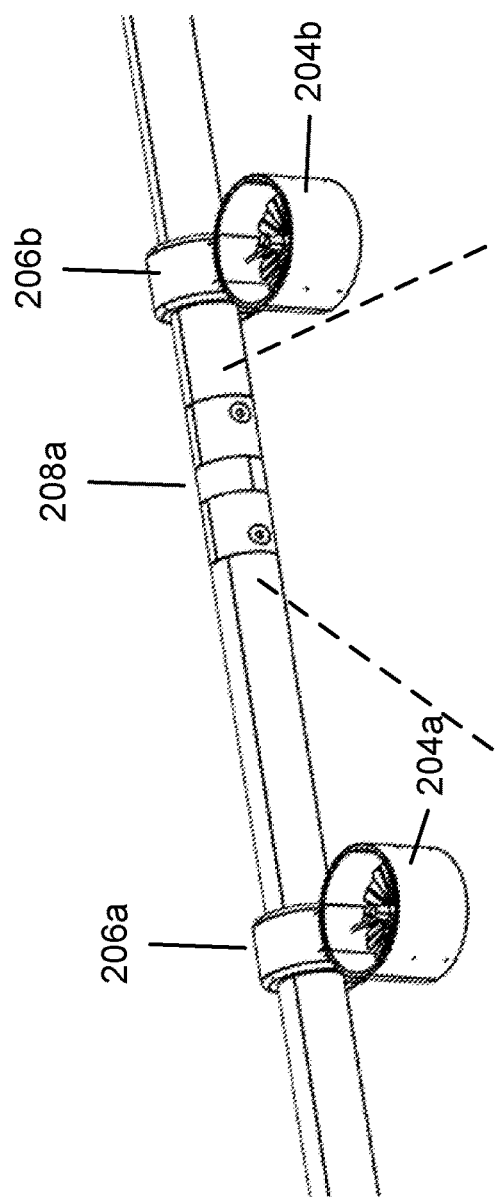
FIG. 3A is a partial view of a boom of the air flow measurement tool according to the example embodiment.
Figure 3B:
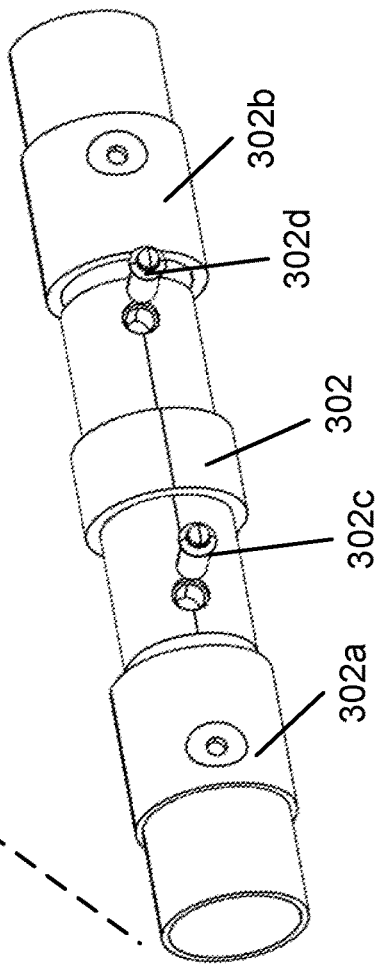
FIG. 3B is an exploded view of a boom segment connector of the air fan measurement tool according to the example embodiment.

FIGS. 3A and 3B are a partial view of the boom and an exploded view of a boom segment connector 208a of the air fan measurement tool 100 according to the example embodiment. As described earlier on FIG. 2 and shown in FIG. 3A, the air fan measurement tool 100 is configured to utilize a plurality of segment connectors to assemble the plurality of segments 112 into the boom 112. In this example, segments 112a and 112b are connected by the segment connector 208a. Specifically, the segment connector 208a, as shown in the exploded view in FIG. 3B, includes a first adaptor 302a, a pole snap center part 302, and a second adaptor 302b. Each of the first and second adaptors 302a and 302b includes a first end in a shape of a tube having an outer diameter equal to an inner diameter of the segments. In addition, the first and second adaptors 302a and 302b each has a second end in a shape of tube having an inner diameter. Further, the pole snap center part 302 has two ends that are identical and that have an outer diameter that equals the inner diameter of the second ends of the first and second adaptors 302a and 302b.

To assemble the segments 112a and 112b as shown in FIG. 3A, the first ends of the first and second adaptors 302a and 302b are inserted into the segments 112a and 112b, respectively. Moreover, the two ends of the pole snap center part 302 are inserted into the second ends of the first and second adaptors 302a and 302b, respectively. In this example, the segment connector 208a further includes a pair of long nose spring plungers 302c and 302d, each being plugged into the two ends of the pole snap center part 302. More particular, the plunger 302c is plugged into one end of the pole snap center part 302 through a hole of the second end of the first adaptor 302a. Similarly, the plunger 302d is plugged into another end of the pole snap center part 302 through a hole of the second end of the second adaptor 302b. With this configuration, the segment connector 208a secures the interconnection between the segments 112a and 112b.

In an example embodiment, the first and second adaptors 302a and 302b can be fabricated to be identical to save manufacturing cost. In an example embodiment, the segment connector 208a including the first adaptor 302a, the pole snap center part 302, the second adaptor 302b are made of titanium or titanium alloys to provide mechanical support to the assembled boom 112.

Figure 4:
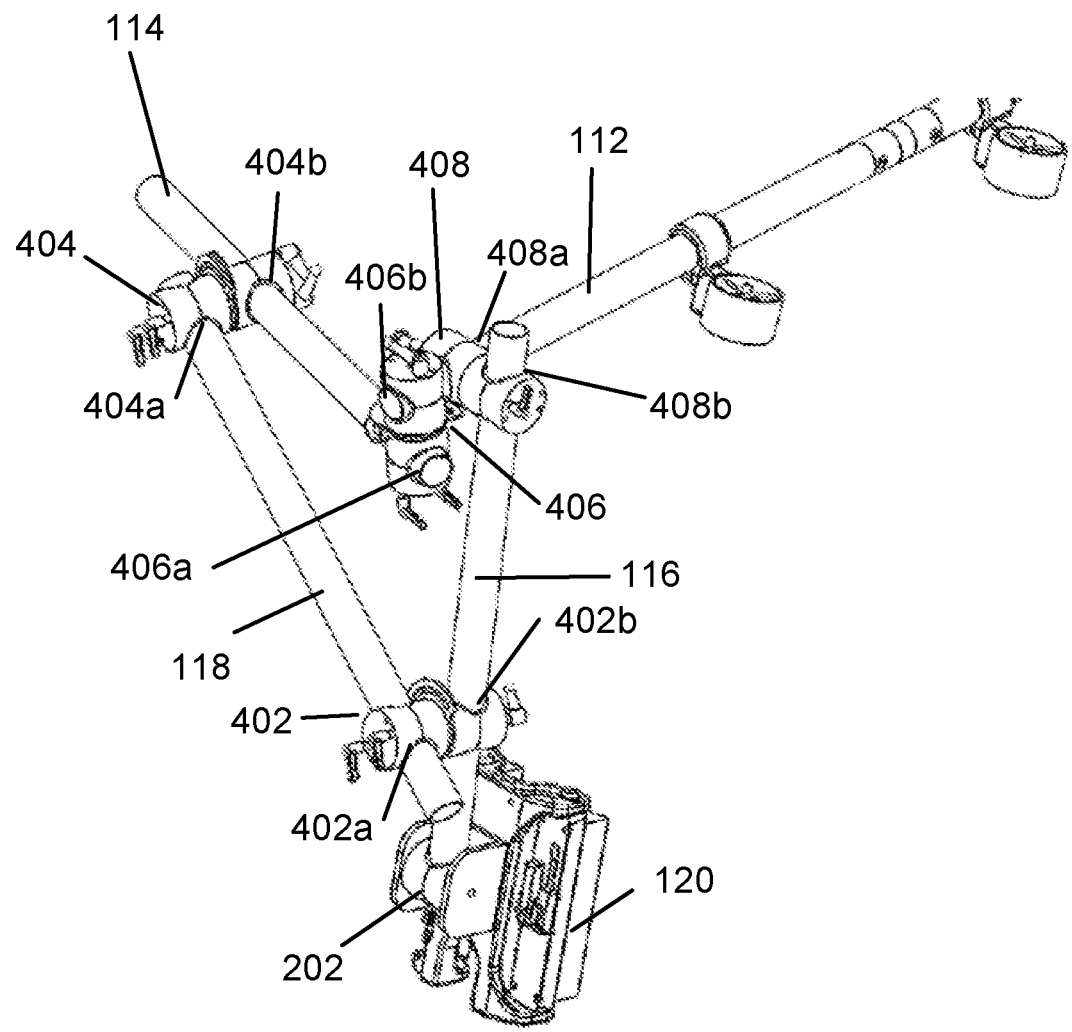
FIG. 4 is a perspective view of a mechanical support portion of the air fan measurement tool according to the example embodiment.

FIG. 4 is a perspective view of a mechanical support portion 400 of the air fan measurement tool 100 according to the example embodiment. As discussed in previous FIGS. 1 and 2, the air fan measurement tool 100 is secured on the air fan 104 by attaching its base 120 on the air fan ring 124. Further, the boom 112 of the air fan measurement tool 100 is supported by the base 120, the vertical support 116, the angular support 118, and the horizontal support 114.

In an example embodiment, the vertical support 116 engages the base 120 by passing the first end of the vertical support 116 through the vertical through hole 210 of the base holder 202. The vertical support 116 is secured on the base holder 210 by passing the securing pin through the base holder 210 and the first end of the vertical support 116. Alternatively, the vertical support 116 may be secured on the base holder 202 by tightening the base holder clamp using a slide lock engaged to the base holder clamp.

In an example embodiment, the air fan measurement tool 100 includes a first connector 402 that is configured to connect the angular support 118 and the vertical support 116. Specifically, the first connector 402 contains two through holes 402a and 402b that can be tilted in parallel. In this example, the first end of the vertical support 116 and a first end of the angular support 118 pass through the through holes 402a and 402b, respectively. The through holes of the first connector 402 can be tilted to adjust an angle between the vertical support 116 and the angular support 118. In addition, the location of the first connector 402 on each of the vertical support 116 and the angular support 118 can be adjusted by fastening each of the through holes 402b and 402a, accordingly. A detailed illustration of components and the configuration of the first connector 402 is provided in FIG. 5.

In an example embodiment, the air fan measurement tool 100 includes a second connector 404 that is configured to connect the angular support 118 and the horizontal support 114. Similar to the first connector 402, the second connector 404 contains two through holes 404a and 404b that can be tilted in parallel. In this example, the second end of the angular support 118 and a first end of the horizontal support 114 respectively pass through the through holes 404a and 404b of the second connector 404. The through holes of the second connector 404 can be tilted and the locations of the second connector 404 on the angular support 118 and the horizontal support 114 can be adjusted so as to properly interconnect the angular support 118 and the horizontal support 114.

In an example embodiment, the air fan measurement tool 100 includes a third connector 406 that is configured to connect the horizontal support 114 and the boom 112. In this example, the third connector 406 contains two through holes 406a and 406b that can be tilted in parallel. Here, the second end of the horizontal support 114 and the first end of the boom 112 respectively pass through the through holes 406a and 406b of the third connector 406. The through holes 406a and 406b can be tilted and the locations of the third connector 406 on the horizontal support 114 and the boom 112 can be adjusted to interconnect the horizontal support 114 and the boom 112.

In an example embodiment, the air fan measurement tool 100 includes a fourth connector 408 that is configured to connect the vertical support 116 and the boom 112. In this example, the fourth connector 408 contains two through holes 408a and 408b that can be tilted in parallel. In this example, the second end of the vertical support 116 and the first end of the boom 112 respectively pass through the through holes 408b and 408a of the fourth connector 408. The through holes 408a and 408b can also be tilted and the locations of the fourth connector 408 on the vertical support 116 and the boom 112 can be adjusted to secure the connection between the vertical support 116 and the boom 112.

In an example embodiment, the above noted components of the mechanical support portion 400 including the vertical support 116, the angular support 118, and the horizontal support 114 are made of titanium or titanium alloys to provide superior mechanical support to the boom 112. In addition, the vertical support 116, the angular support 118, and the horizontal support 114 may all have a shape of straight bar. In an example embodiment, the first connector 402, the second connector 404, the third connector 406, and the fourth connector 408 are all fabricated to be identical to save manufacturing cost.

Figure 5A:
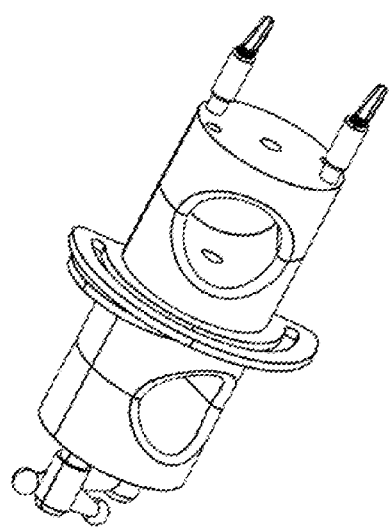
FIG. 5A is a perspective view of a connector of the air fan measurement tool according to the example embodiment.
Figure 5B:
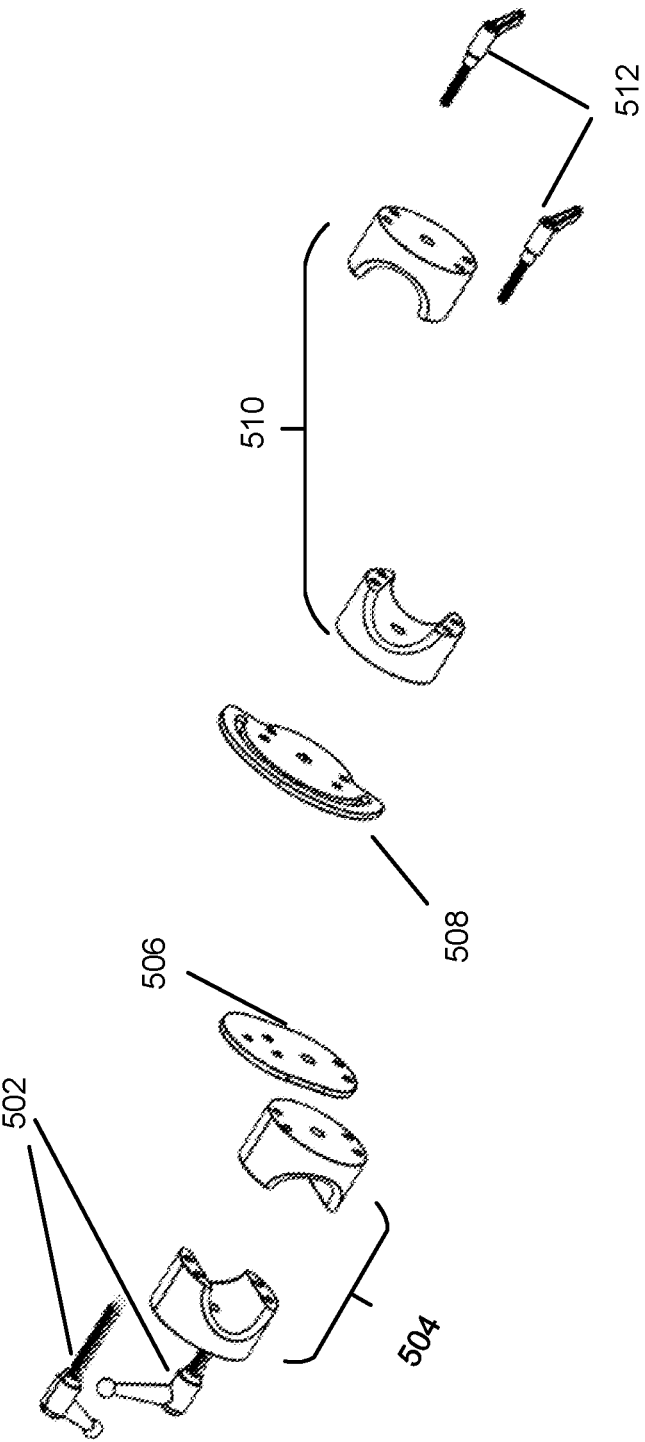
FIG. 5B is an exploded view of the connecter of the air fan measurement tool according to the example embodiment.

FIGS. 5A and 5B reveal a perspective view and an exploded view of the first connecter 402 of the air fan measurement tool 100 according to the example embodiment. As discussed above, the second connector 404, the third connector 406, and the fourth connector 408 may all have a same configuration to the first connector 402. As shown in FIG. 5B, the first connector 402 includes a pair of adjustable handles 502, a first pair of inner clamps 504, a first arm adjust lock plate 506, a second arm adjust lock plate 508, a second pair of inner clamps 510, and a pair of temporary adjustable handles 512.

In an example embodiment, the first pair of inner clamps are connected by passing through the pair of adjustable handles 502. In addition, the inner clamps of the first pair of inner clamps 504 each has an inner concavity and are combined to form the second through hole 402b. Similarly, the second pair of inner clamps 510 are connected by passing through the pair of temporary adjustable handles 512. The profile of the second pair of inner clamps 510 may be the same as the first pair of inner clamps 504 and are combined to form the first through hole 402a. The first pair of inner clamps 504 and the second pair of inner clamps 510 engage each other through the first arm adjust lock plate 506 and the second arm adjust lock plate 508.

In an example embodiment and as shown in the FIG. 5B, there are through holes on the first pair of inner clamps 504 and the second pair of inner clamps 510, through which the pair of adjustable handles 502 and the pair of temporary adjustable handles 512 pass, respectively. Further, the first arm adjust lock plate 506 is locked to the first pair of inner clamps 504 and the second arm adjust lock plate 508 is locked on the second pair of inner clamps 510. A tilting of the through holes 402a and 402b can be performed by rotating the first arm adjust lock plate 506 and the second arm adjust lock plate 508 within a transverse plane of the first connector 402. In this example, the second connector 404, the third connector 406, and the fourth connector 408 may be configured to have a same configuration to the first connector 402.

Figure 6:
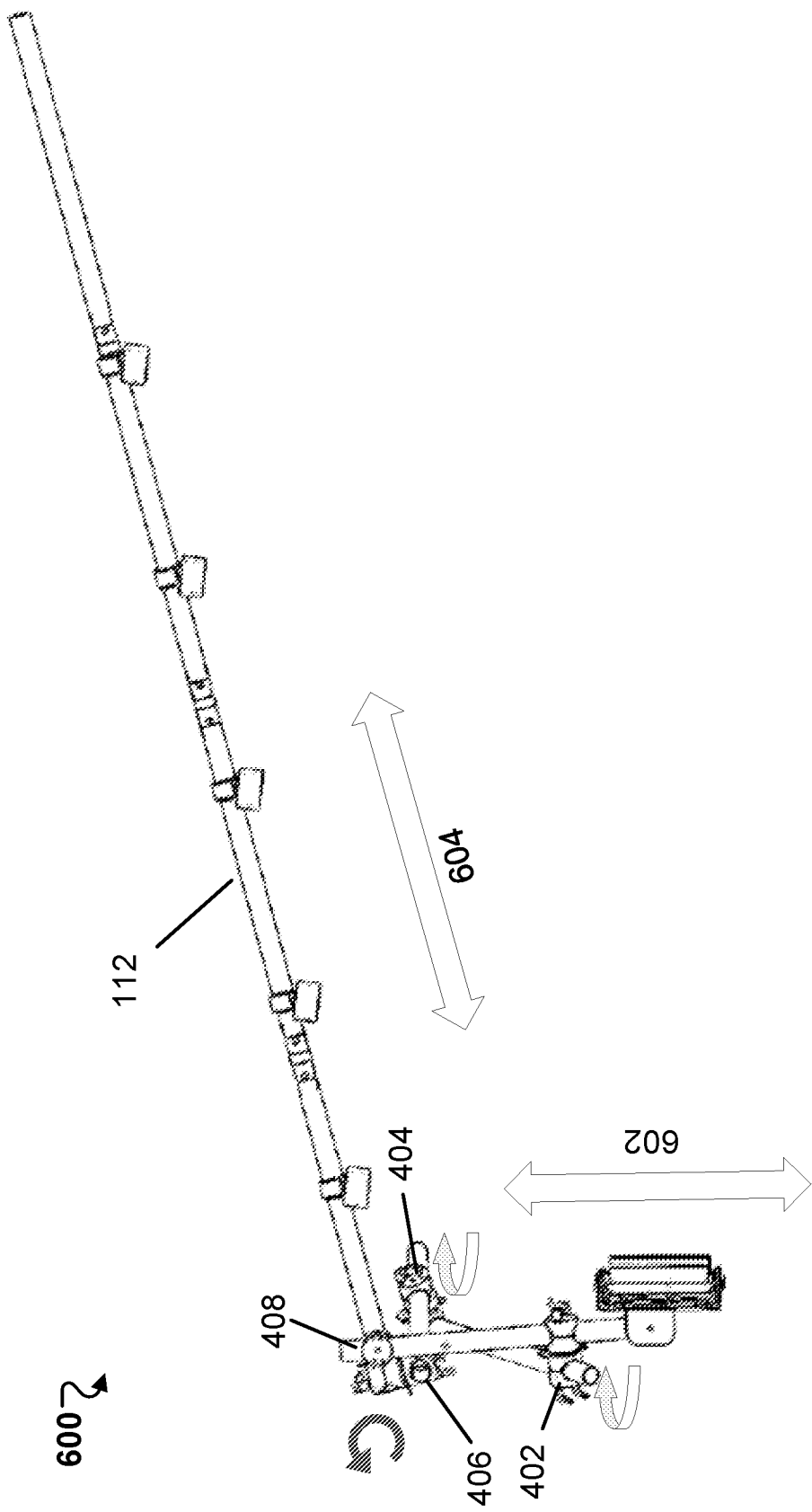
FIG. 6 illustrates a working example of tilting the boom of the air fan measurement tool according to an example embodiment.

In the air fan measurement tool 100, the configurations of each of the connectors and supports are interrelated. A modification of one of the connectors or supports affects the neighboring connectors or supports. Specifically, adjusting one component of the air fan mechanical support portion 400, e.g., a connector, requires configuration changes of neighboring connectors or supports. FIG. 6 illustrates a working example of tilting the boom 112 of the air fan measurement tool 100 according to an example embodiment. In this example, the air fan ring 124 is disposed along a vertical direction 602 and the sloped air fan guard, such as a wire screen, is disposed along a longitude axis 604 that is tilted from the air fan plane. As discussed earlier, the boom 112 may be adjusted according to the profile of the air fan guard and the air fan measurement devices 204 are further configured to be parallel to the air fan plane for the air flow and air temperature measurements.

It has been discussed earlier in this application that the first end of the boom 112 engages the vertical support 116 and the horizontal support 114 by passing its first end through the first through hole of the fourth connector 408 and the second through hole 406b of the third connector 406, respectively. In this example, the first end of the boom 112 is secured relative to the third and fourth connectors 406 and 408, therefore the second end of the boom 112 needs to be tilted up vertically in order to adjust the boom 112. This tilting of the boom 112 can be achieved by rotating the first through hole 408a of the fourth connector 408 in a counterclockwise direction, as shown in FIGS. 4 and 6.

Further, the rotation of the first through hole 408a leads to a tilting of the third connector 406 along the same counterclockwise direction. These changes of the third and fourth connectors 406 and 408 break an existing balance among the vertical support 116, the angular support 116, and the horizontal support 114. To change the modifications of the third and fourth connectors 406 and 408 as discussed above, the modification of the first and second connectors 402 and 404 as well as the angular support 116 and the horizontal support 114 need to be changed accordingly. For example, the first and second connectors 402 and 404 may be rotated along a clockwise direction, as shown in FIG. 6, to accommodate the changes of the third and fourth connectors 406 and 408. Moreover, the vertical support 116 may be tilted to have its second end moved farther away from the air fan ring 124. The above discussed configuration changes on the connectors and supports maintain the mechanical support portion 400 mechanically stable.

FIG. 7 illustrates a method for measuring air flow and air temperature by the air fan measurement tool 100 according to an example embodiment. Referring to FIGS. 1 and 6, in an example embodiment, the method 700 includes assembling a boom by connecting a plurality of segments, at 702. For example, the boom 112 is assembled by connection the plurality of segments 112a, 112b, 112c, and 112d by the segment connectors 208a, 208b, and 208c. The number of segments selected for the boom is determined by the desired major length of the boom. The method 700 also includes attaching a plurality of air fan measurement devices to the boom, at 704. For example, the air fan measurement devices 204a, 204b, 204c, 204d, and 204e are attached on the boom 112 by a plurality of mounting clamps 206a, 206b, 206c, 206d, and 206e, respectively. Each of the air fan measurement devices 204 can be equidistantly spaced from an adjacent air fan measurement device and can be tilted independently for the air flow and air temperature measurements.

In addition, the method 700 includes attaching a base to an air fan ring of an air fan, wherein blades of the air fan rotate in an air fan plane, at 706. For example, after the boom 112 is assembled and the air measurement devices are attached thereon, the base 120 of the air fan measurement tool 100 is attached to the air fan ring 124 at a desired location. The selected location of attaching the base 120 on the air fan ring 124 is determined by a required height of the boom 112 above or below the air fan 102 and a length of the vertical support 116.

Next, the method 700 includes attaching a vertical support to the base, attaching an angular support and a horizontal support to the vertical support, and connecting the angular support and the horizontal support, respectively, at 708. For example, the vertical support 116 can be attached on the base 120 by passing its first end through the through hole 210 of the base holder 202. Further, the angular support 118 can be engaged to the vertical support 116 through a first connector 402. The first end of the angular support 118 and the second end of the vertical support 116 respectively pass through the first through hole 402a and the second through hole 402b for the interconnection. Similarly, the second end of the angular support 118 and the first end of the horizontal support 114 respectively pass through a first through hole 404a and a second through hole 404b of the second connector 404 for the interconnection therebetween.

The method 700 also includes installing the boom by attaching the boom to the vertical support and the horizontal support, the boom having a major length with a longitudinal axis passing along the major length, at 710. For example, the second end of the horizontal support 114 and the first end of the boom 112 are configured to pass through the first through hole 406a and the second through hole 406b of the connector 406 to form the interconnection therebetween. Here, the boom 112 is attached on the mechanical support portion 400 so that it is suspended over or below the air fan 102.

Moreover, the method 700 includes adjusting the horizontal support and the angular support to orient the boom such that the longitudinal axis is in a required angle to the air fan plane, at 712. For example, the boom 112 is configured to be attached on the mechanical support portion 400 to have its longitudinal axis parallel to the sloped air fan guard. In this example, the horizontal support 114 and the angular support 118 can be adjusted to rotate a first pair of inner clamps of the fourth connector 408 in clockwise or counterclockwise directions. A second end of the boom 112 that is close to the air fan center can be tilted up or down by adjusting an angle of the through hole 408a of the fourth connector 408. With this configuration, the air fan measurement devices attached on the boom 112 are further adjusted to be parallel to the air fan plane for air flow and air temperature measurements, at 714. In other words, the anemometers of the air fan measurement devices spin about an anemometer axis that is parallel to the axis of rotation of the about which the blades of the air fan 102 rotate.

Lastly, the method 700 includes powering on the plurality of air fan measurement devices to measure air flows generated by the air fan and temperatures of the air flows, at 716. For example, each the air fan measurement devices 204 has an electrical wire connected to the air fan measurement interface device and a power source for data and power transition. In particular, each of the air fan measurement devices 204 can be controlled and switched on/off independently through the air fan measurement interface device.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

Referring generally to the examples herein, any components of the tool, described herein can be made from a single piece (e.g., as from a mold, injection mold, die cast, 3-D printing process, extrusion process, stamping process, or other prototype methods). In addition, or in the alternative, a component of the tool can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Terms such as "first", "second", "top", "bottom", "side", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A portable air fan measurement tool, comprising:
    a base comprising a magnet, the magnet being configured to attach the base to an air fan ring of an air fan, wherein blades of the air fan rotate in an air fan plane;
    a vertical support having a first end configured to engage the base, wherein the vertical support is disposed adjacent to the air fan ring when the base is attached to the air fan ring;
    an angular support having a first end configured to engage the vertical support;
    a horizontal support having a first end configured to engage a second end of the angular support;
    a boom having a first end that is configured to engage a second end of the vertical support and a second end of the horizontal support, the boom having a major length with a longitudinal axis passing along the major length, wherein the longitudinal axis extends across the air fan plane when the base is attached to the air fan ring; and
    a plurality of air fan measurement devices that are disposed on the boom, each of the plurality of air fan measurement devices including an anemometer configured to measure an air flow generated by the air fan and a thermometer configured to measure a temperature of the air flow, wherein the plurality of air fan measurement devices are adjusted to be parallel to the air fan plane.

2. The portable air fan measurement tool of claim 1, wherein the plurality of air fan measurement devices are located on circles that are concentric about a center of the air fan.

3. The portable air fan measurement tool of claim 1, wherein each of the plurality of air fan measurement devices includes an electrical cable configured to transmit electrical signals to an instrument interface device, wherein the electrical cables of the plurality of air fan measurement devices are arranged along the major length of the boom by grouping the electrical cables through a plurality of wire management rings that are disposed on the boom.

4. The portable air fan measurement tool of claim 3, wherein the plurality of air fan measurement devices are attached on the boom by a plurality of mounting clamps, respectively.

5. The portable air fan measurement tool of claim 1,
    wherein the boom is disposed above the air fan or below the air fan, and
    wherein the boom includes:
        a plurality of segments, wherein each of the plurality of segments has adaptors installed on both ends, and
        a plurality of segment connectors that are configured to connect the plurality of segments by securing both ends of each of the plurality of segment connectors into adjacent adaptors of neighboring segments on the boom.

6. The portable air fan measurement tool of claim 1,
    wherein each of the plurality of air fan measurement devices can be tilted independently, and
    wherein the boom is adjusted to have its longitudinal axis parallel to the air fan plane.

7. The portable air fan measurement tool of claim 1, wherein the base is attached to the air fan ring by switching on the magnet and securing the base thereon through magnetic force generated by the magnet.

8. The portable air fan measurement tool of claim 1, wherein the vertical support engages the base by inserting its first end through a base holder that is attached to the base.

9. The portable air fan measurement tool of claim 1, further comprises:
- a first connector wherein the first end of the vertical support passes through a first through hole of the first connector, and the first end of the angular support passes through a second through hole of the first connector;
- a second connector wherein the second end of the angular support passes through a first through hole of the second connector, and the first end of the horizontal support passes through a second through hole of the second connector;
- a third connector wherein the first end of the boom passes through a first through hole of the third connector, and the second end of the horizontal support passes through a second through hole of the third connector; and
- a fourth connector wherein the second end of the vertical support passes through a first through hole of the fourth connector, and the one end of the boom passes through a second through hole of the fourth connector.

10. The portable air fan measurement tool of claim 9, wherein the vertical support, the angular support, and the horizontal support are secured relative to each other to provide mechanical support to the boom.

11. The portable air fan measurement tool of claim 9, wherein the boom can be tilted by rotating the fourth connector in a plane in parallel to the vertical support and rotating the third connector in a plane perpendicular to the horizontal support.

12. The portable air fan measurement tool of claim 1, wherein the vertical support, the angular support, the horizontal support, and the boom are made of titanium or titanium alloys.

13. A method of operating an air fan measurement tool, comprising:
- assembling a boom by connecting a plurality of segments;
- attaching a plurality of air fan measurement devices to the boom;
- attaching a base to an air fan ring of an air fan, wherein blades of the air fan rotate in an air fan plane;
- attaching a vertical support to the base, attaching an angular support and a horizontal support to the vertical support, and connecting the angular support and the horizontal support, respectively;
- installing the boom by attaching the boom to the vertical support and the horizontal support, the boom having a major length with a longitudinal axis passing along the major length;
- adjusting the horizontal support and the angular support to orient the boom such that the longitudinal axis extends across the air fan plane;
- adjusting the plurality of the air fan measurement devices to be parallel to the air fan plane; and
- powering on the plurality of air fan measurement devices to measure air flows generated by the air fan and temperatures of the air flows.

14. The method of claim 13, further including moving the base on the air fan ring to adjust a height of the plurality of air fan measurement devices relative to the air fan plane.

15. The method of claim 13,
- wherein the base includes a magnet, the magnet being configured to attach the base to the air fan ring of the air fan, and
- wherein the base is attached to the frame of the air fan ring by switching on the magnet and securing the base thereon through magnetic force generated by the magnet.

16. The method of claim 13,
- wherein the vertical support is disposed adjacent to the air fan ring of the air fan, the vertical support having a first end configured to engage the base,
- wherein the angular support has a first end configured to engage the vertical support, and
- wherein the horizontal support has a first end configured to engage a second end of the angular support.

17. The method of claim 13, wherein the boom has one end that is configured to engage a second end of the vertical support and a second end of the horizontal support.

18. The method of claim 13, wherein the air fan measurement tool comprises:
- a first connector, wherein the first end of the vertical support passes through a first through hole of the first connector, and the first end of the angular support passes through a second through hole of the first connector,
- a second connector, wherein the second end of the angular support passes through a first through hole of the second connector, and the first end of the horizontal support passes through a second through hole of the second connector,
- a third connector wherein the first end of the boom passes through a first through hole of the third connector, and the second end of the horizontal support passes through a second through hole of the third connector, and
- a fourth connector wherein the second end of the vertical support passes through a first through hole of the fourth connector, and the first end of the boom passes through a second through hole of the fourth connector.

19. The method of claim 13, wherein each of the plurality of air fan measurement devices includes an anemometer configured to measure an air flow generated by the air fan and a thermometer configured to measure a temperature of the air flow.

20. The method of claim 13, wherein tilting the boom includes rotating the fourth connector in a plane in parallel to the vertical support and rotating the third connector in a plane perpendicular to the horizontal support.

* * * * *